(12) United States Patent
Kipper et al.

(10) Patent No.: US 11,667,249 B2
(45) Date of Patent: Jun. 6, 2023

(54) MOUNT APPARATUS FOR SECURING AN ELECTRONIC DEVICE TO A SURFACE

(71) Applicant: ESCORT INC., Chicago, IL (US)

(72) Inventors: Kevin L. Kipper, Liberty Township, OH (US); Yusan Zheng, Brampton (CA); Daniel J. Bartosik, Centerville, OH (US)

(73) Assignee: Escort Inc., Chicago, IL (US)

( * ) Notice: Subject to any disclaimer, the term of this patent is extended or adjusted under 35 U.S.C. 154(b) by 0 days.

(21) Appl. No.: 17/549,303

(22) Filed: Dec. 13, 2021

(65) Prior Publication Data

US 2022/0097619 A1 Mar. 31, 2022

Related U.S. Application Data

(63) Continuation of application No. 16/500,510, filed as application No. PCT/US2018/025944 on Apr. 3, 2018, now Pat. No. 11,198,397.
(Continued)

(51) Int. Cl.
*F16M 11/00* (2006.01)
*B60R 11/02* (2006.01)
(Continued)

(52) U.S. Cl.
CPC ............ *B60R 11/02* (2013.01); *H01F 7/0252* (2013.01); *B60R 11/0211* (2013.01);
(Continued)

(58) Field of Classification Search
None
See application file for complete search history.

(56) References Cited

U.S. PATENT DOCUMENTS 5,028,223 A * 7/1991 Ameter ................ B29C 73/025
425/13
6,135,408 A 10/2000 Richter
(Continued)

FOREIGN PATENT DOCUMENTS

CN 102147643 A 8/2011
CN 102878402 A 1/2013
(Continued)

OTHER PUBLICATIONS

International Search Report issued in related International Patent Application No. PCT/US2018/025944 dated Jun. 28, 2018. 2 pages.
(Continued)

*Primary Examiner* — Steven M Marsh
(74) *Attorney, Agent, or Firm* — K&L Gates LLP

(57) ABSTRACT

Various embodiments of a mount apparatus are disclosed herein for securing an electronic device (such as a radar laser detector, GPS device, and/or dash camera or other electronic device used within a vehicle) to a surface such as an interior surface (e.g., windshield, dashboard) of a vehicle. In one example, the mount apparatus includes a magnet which is adapted to be coupled with a corresponding metal surface within the electronic device, so that the magnet positioned within the apparatus provides a magnetic force to aid a user in securing the mount apparatus and the electronic device to each other.

11 Claims, 5 Drawing Sheets

Related U.S. Application Data

(60) Provisional application No. 62/480,695, filed on Apr. 3, 2017.

(51) Int. Cl.
    *H01F 7/02*     (2006.01)
    *B60R 11/00*     (2006.01)

(52) U.S. Cl.
    CPC ....... *B60R 11/0241* (2013.01); *B60R 11/0252* (2013.01); *B60R 11/0258* (2013.01); *B60R 2011/007* (2013.01); *B60R 2011/0026* (2013.01); *B60R 2011/0056* (2013.01); *B60R 2011/0085* (2013.01)

(56) References Cited

U.S. PATENT DOCUMENTS

| | | | |
|---|---|---|---|
| 6,888,940 | B1 | 5/2005 | Deppen |
| 7,374,142 | B2 | 5/2008 | Carnevali |
| 8,602,376 | B2 | 12/2013 | Vogel et al. |
| 8,706,175 | B2 | 4/2014 | Cho |
| 9,531,424 | B1 | 12/2016 | Tucker |
| 10,583,790 | B2 * | 3/2020 | Wang .................... F16M 13/00 |
| 2004/0188576 | A1 | 9/2004 | Carnevali |
| 2004/0256529 | A1 | 12/2004 | Richter |
| 2007/0262216 | A1 | 11/2007 | Wang |
| 2009/0050758 | A1 | 2/2009 | Carnevalli |
| 2009/0294608 | A1 | 12/2009 | Brassard |
| 2011/0260022 | A1 | 10/2011 | Lin |
| 2012/0305733 | A1 | 12/2012 | Vogel et al. |
| 2014/0191096 | A1 * | 7/2014 | Wiercinski ............ F16M 13/00 248/206.5 |
| 2014/0263908 | A1 | 9/2014 | Franklin |
| 2014/0355200 | A1 * | 12/2014 | Thiers .................... H04M 1/04 361/679.41 |
| 2015/0207535 | A1 | 7/2015 | Wilson |
| 2016/0173667 | A1 | 6/2016 | Gutierrez et al. |
| 2016/0229352 | A1 | 8/2016 | Zhang |
| 2016/0246328 | A1 | 8/2016 | Christie, II |
| 2018/0159369 | A1 | 6/2018 | McSweyn et al. |
| 2021/0178862 | A1 * | 6/2021 | Alves ..................... B60R 11/02 |
| 2021/0281090 | A1 * | 9/2021 | Stevens ................. F16M 13/04 |

FOREIGN PATENT DOCUMENTS

| | | |
|---|---|---|
| CN | 104044516 A | 9/2014 |
| CN | 104154390 A | 11/2014 |
| CN | 104968531 A | 10/2015 |
| CN | 205905906 U | 1/2017 |
| CN | 106536284 A | 3/2017 |
| JP | 5-16956 | 1/1993 |
| JP | H0516956 A | 1/1993 |
| JP | 3067074 U | 3/2000 |
| JP | 2010-232289 | 10/2010 |
| JP | 2010232289 A | 10/2010 |
| JP | 3176994 U | 6/2012 |
| JP | 2020515464 A | 5/2020 |
| WO | 2013/029049 | 2/2013 |
| WO | 2014/107256 | 7/2014 |
| WO | 2014/145748 | 9/2014 |
| WO | 2015/124994 | 8/2015 |
| WO | 2015124994 A1 | 8/2015 |

OTHER PUBLICATIONS

International Written Opinion issued in related International Patent Application No. PCT/US2018/025944 dated Jun. 28, 2018. 6 pages.
International Search Report issued in related International Patent Application No. PCT/US2018/025944 dated Dec. 3, 2020 (7 pages).
Japanese Office Action for App. No. 2019-555027 dated Mar. 22, 2022 (6 pages).
Philippine Office Action dated Dec. 13, 2021 (7 pages).
Official action dated Aug. 18, 2022 for Chinese Patent Application No. 201880023230.6.
Search report dated Aug. 18, 2022 for Chinese Patent Application No. 201880023230.6.
Notice of Reasons for Rejection of Japanese Patent Application No. 2019-555027 dated Mar. 14, 2023 (10 pages with English translation).

* cited by examiner

MOUNT APPARATUS FOR SECURING AN ELECTRONIC DEVICE TO A SURFACE

CROSS REFERENCE TO RELATED APPLICATIONS

The present application is a continuation of U.S. patent application Ser. No. 16/500,510, filed on Oct. 3, 2019 which is a National Stage of International Application No. PCT/US2018/025944, filed on Apr. 3, 2018, which claims the benefit of U.S. provisional application Ser. No. 62/480,695, filed on Apr. 3, 2017, the entire contents of which are being incorporated herein by reference.

TECHNICAL FIELD

The present disclosure relates generally to apparatuses for securing electronic devices to surfaces such as a vehicle windshield.

BACKGROUND

Electronic devices—such as radar/laser detectors, GPS devices, and dash cameras or other electronic devices used within a vehicle—are typically temporarily mounted by a user to an interior surface of a vehicle such as the interior surface of a windshield or other surface such as a dashboard or interior door surface. Various apparatuses or interfaces have been developed that a user can attach, and later detach, to both the electronic device and to a surface such as a windshield surface. The effectiveness of these apparatuses depends in part on their ability to securely connect and hold the electronic device in place relative to the windshield—which depends on the degree to which the apparatus is securely connected with the electronic device, particularly as the vehicle travels on a road which imparts various vibrations, movements and forces upon the apparatus and electronic device as it is mounted to the windshield surface.

While the connection between the apparatus and the electronic device needs to be secure, the user also needs to be able to detach or disconnect the electronic device from the apparatus whenever the user desires, such as when the user leaves the vehicle.

SUMMARY

Improved apparatuses for mounting electronic devices to surfaces of a vehicle (such as an interior surface of a windshield) are provided in which the apparatus enables a user to securely attach and detach the electronic device to the apparatus for mounting on an interior vehicle surface such as a windshield.

According to one broad aspect of one embodiment of the present disclosure, disclosed herein is mount apparatus for securing an electronic device (such as a radar/laser detector, GPS device, and/or dash camera or other electronic device used within a vehicle) to a surface such as an interior surface (e.g., windshield, dashboard) of a vehicle. In one example, the mount apparatus includes a magnet which is adapted to be coupled with a corresponding metal surface within the electronic device, so that the magnet positioned within the apparatus provides a magnetic force to aid a user in securing the mount apparatus and the electronic device to each other.

In another embodiment, a mount apparatus for mounting an electronic device to a surface such as a windshield is provided. The mount apparatus includes a main with a suction surface adapted to couple to the surface and a magnetic sub-assembly including at least one magnet. The magnet is adapted to engage with a metal component of the electronic device. The magnetic sub-assembly further includes a lip extending in an outward direction from the magnetic sub-assembly. The lip is adapted to structurally engage a cooperating lip of the electronic device in a first coupled configuration and is adapted to be disengaged from the cooperating lip of the electronic device in second disengaged configuration.

Other embodiments of the disclosure are described herein. The features, utilities and advantages of various embodiments of this disclosure will be apparent from the following more particular description of embodiments as illustrated in the accompanying drawings.

DETAILED DESCRIPTION

Figure 1:
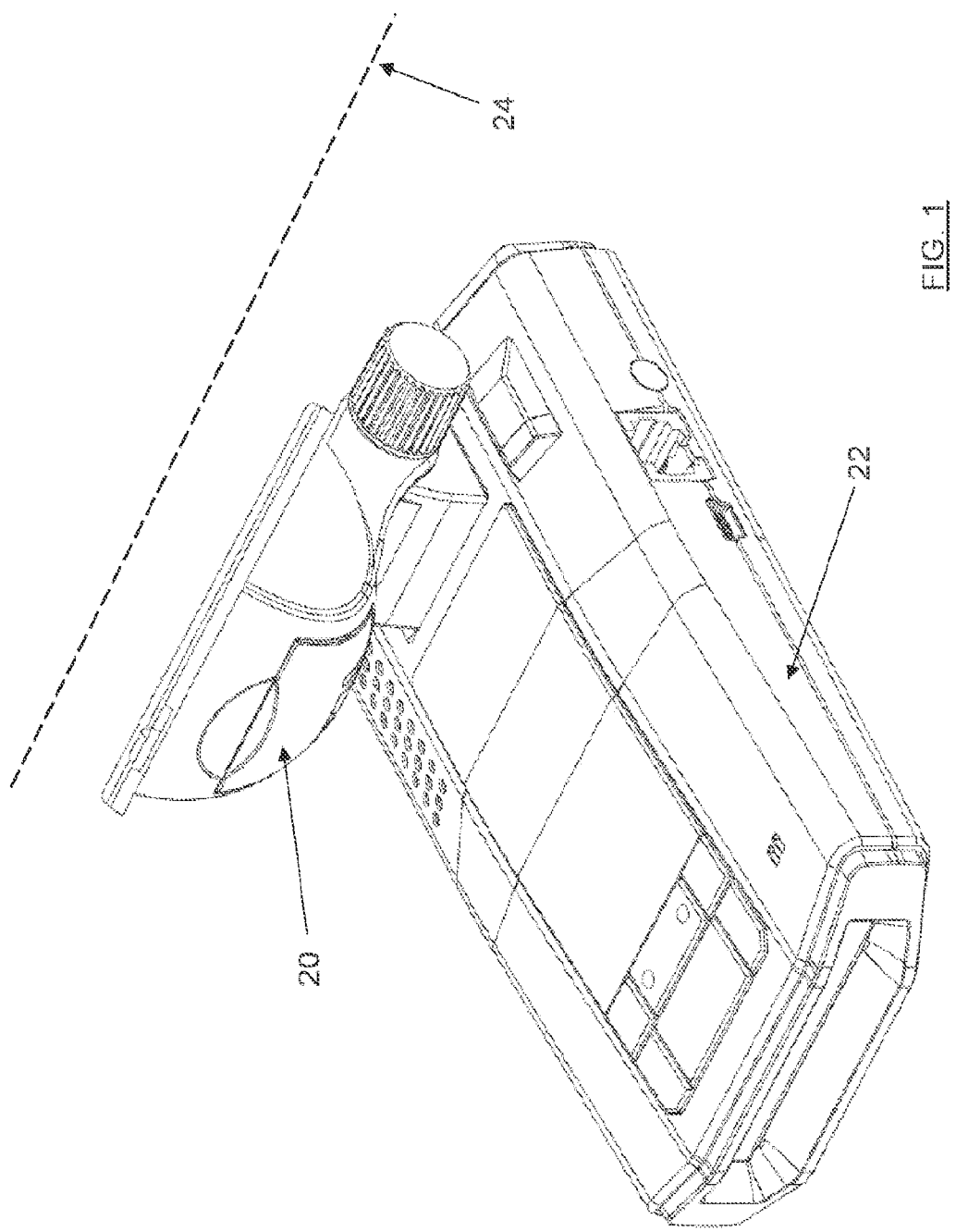
FIG. 1 illustrates an example of a mount apparatus coupled with an electronic device, in accordance with one example of the present disclosure.

Disclosed herein are various embodiments of mount apparatuses for securing electronic devices (such as a radar/laser detector, GPS device, and/or dash camera or other electronic device used within a vehicle) to surfaces such as an interior surface (e.g., windshield, dashboard) of a vehicle. For purposes of simplicity, the mount apparatuses of the present disclosure will be described in terms of their use to attach and detach an electronic device to an interior windshield surface of a vehicle such as an automobile. Various embodiments of a mount apparatus are disclosed herein.

The following detailed description refers to the accompanying drawings that depict various details of examples selected to show how particular embodiments may be implemented. The discussion herein addresses various examples of vehicle mounts at least partially in reference to these drawings and describes the depicted embodiments in sufficient detail to enable those skilled in the art to practice the embodiments. Many other embodiments may be utilized for practicing the subject matter other than the illustrative examples discussed herein, and many structural and operational changes in addition to the alternatives specifically discussed herein may be made without departing from the scope of the disclosed subject matter.

In this description, references to "one embodiment" or "an embodiment," or to "one example" or "an example" mean that the feature being referred to is, or may be, included in at least one embodiment or example of the disclosure. Separate references to "an embodiment" or "one embodiment" or to "one example" or "an example" in this description are not intended to necessarily refer to the same embodiment or example. Thus, the present disclosure includes a variety of combinations and/or integrations of the embodiments and examples described herein, as well as further embodiments and examples as defined within the scope of all claims based on this disclosure, as well as all legal equivalents of such claims.

Referring to FIGS. 1-5, a mount apparatus 20 is adapted to securely connect electronic device 22 to a surface 24 (see FIG. 1) such as an interior of a windshield, a dashboard, or other surface.

Mount apparatus 20 has a main body 30, one or more flanges or arms 32 extending from the main body 30, and a magnet sub-assembly member 34. The magnet sub-assembly member 34 may include one or more magnets 36, and may also be connected to arms 32 via an adjustable or lockable hinge 38. Mount apparatus 20 may also include a suction interface 40 such as a suction cup made of Mylar, rubber, plastic or other material, the suction interface 40 being adapted to secure the mount apparatus to surface 24 as desired by the user. The suction interface 40 may include a post 42 that extends through the main body 30 and is connected to a lever 44, with a spring 46 disposed (e.g., riding) around the post 42.

Figure 2:
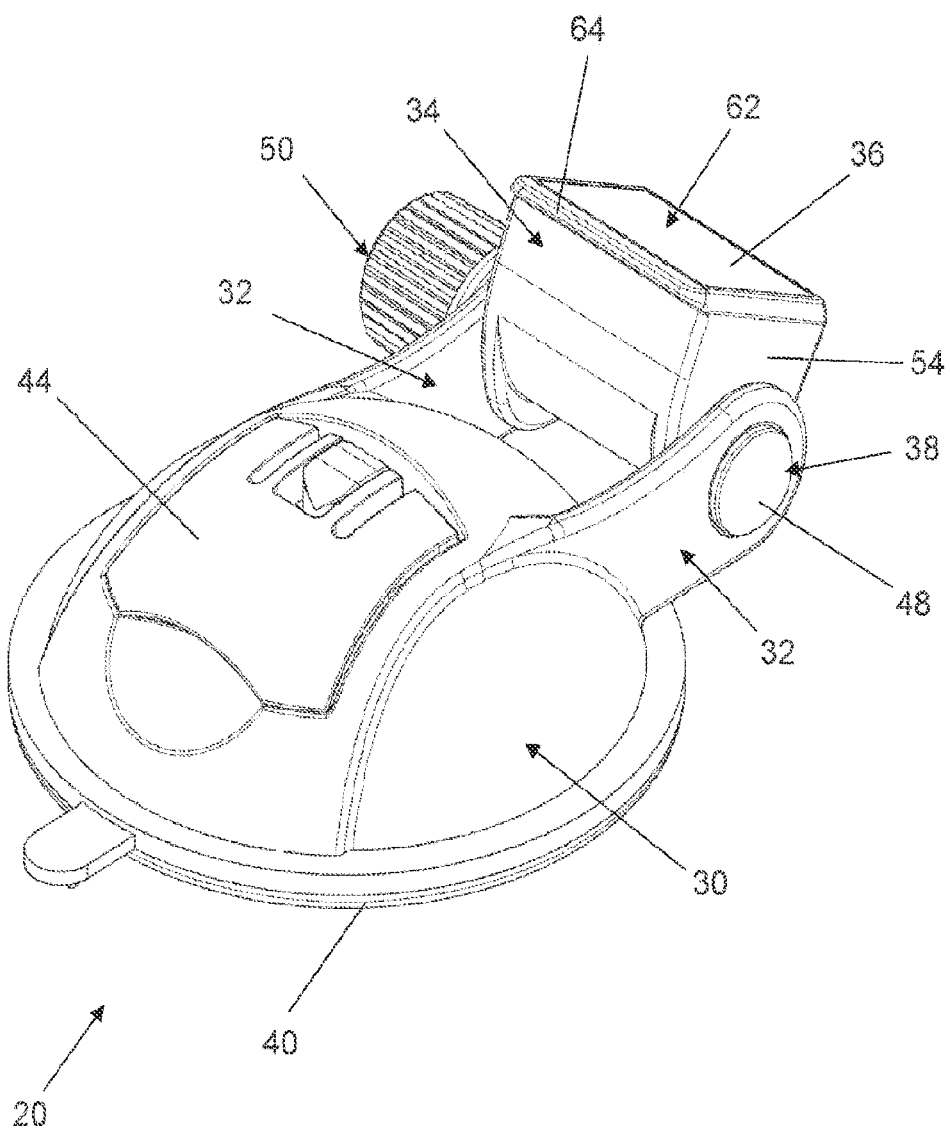
FIG. 2 illustrates an example of mount apparatus, in accordance with one embodiment of the present disclosure.
Figure 3:
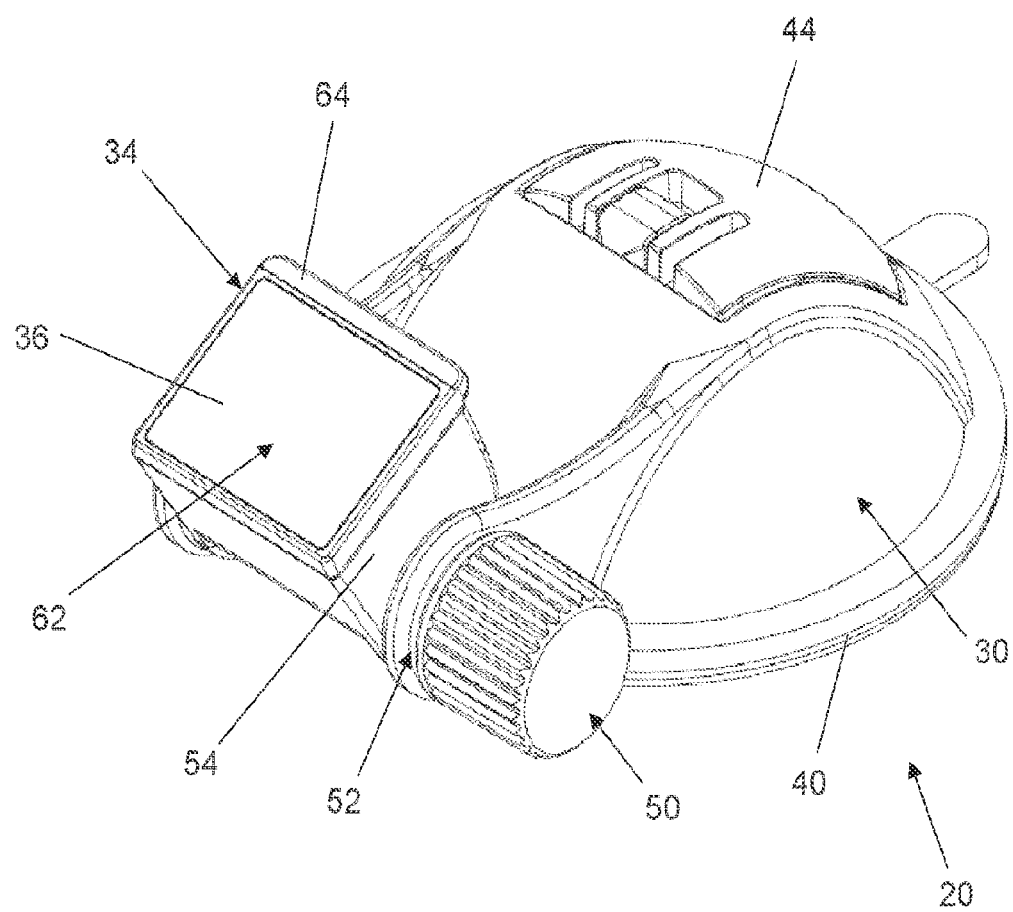
FIG. 3 illustrates another view of an example of a mount apparatus, in accordance with one embodiment of the present disclosure.
Figure 4:
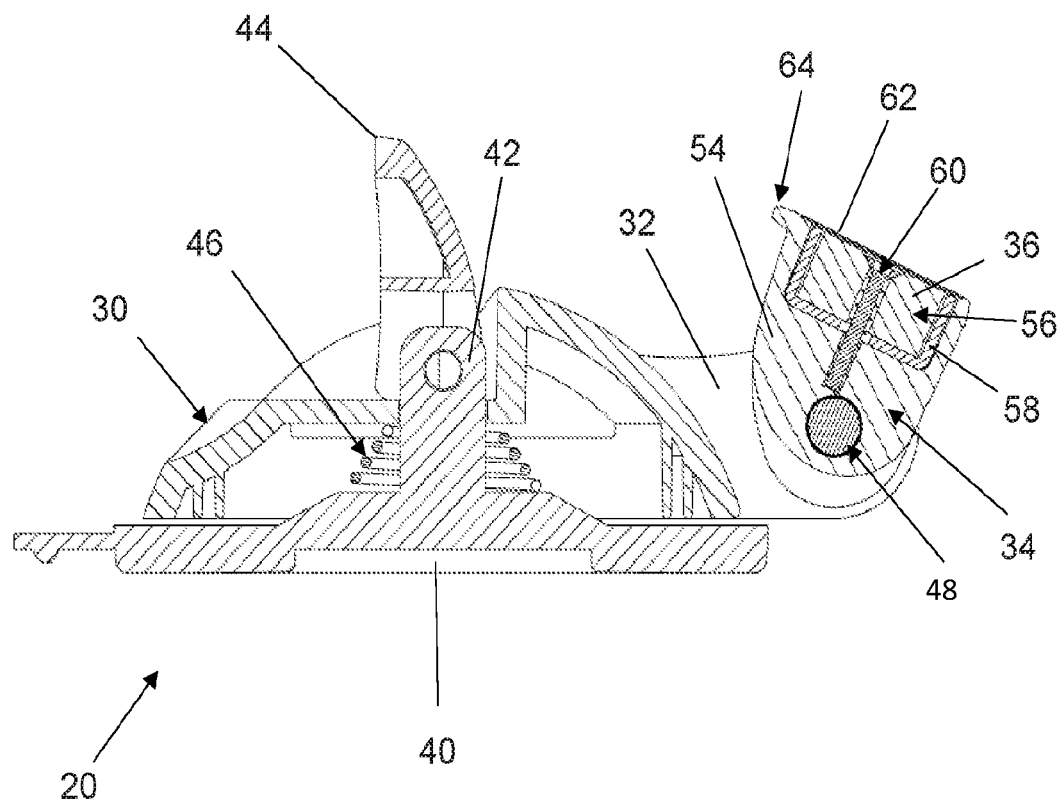
FIG. 4 illustrates a sectional view of an example of mount apparatus, in accordance with one embodiment of the present disclosure.

In one example, as shown in FIG. 4, when the lever 44 is in the upward position extending outwardly from main body 30, the post 42 and spring 46 are pushed outwardly/downwardly such that the suction interface 40 is generally flat. As shown in FIGS. 1-3, during use when a user positions mount apparatus 20 on a surface 24 such as a windshield, and the user moves lever 44 into a downward position flush with the outer surface of main body 30, this causes lever 44 to pull the post 42 inwardly which also pulls spring 46 inwardly such that the center of suction interface 40 is moved inwardly so as to create suction between the suction interface 40 and surface 24.

As shown in FIGS. 2-5, the magnet sub-assembly 34 is attached, in one example, to the main body 30 through a bolt 48 which may have a knob 50 attached to one end. A washer 52 may be positioned between a flange 32 and the knob 50. A user can rotate knob 50 to tighten or loosen the connection between the magnet sub-assembly 34 and the main body 30—for instance during use when the user desires to set or change the angle at which electronic device is positioned relative to the mount apparatus 20 or surface 24.

In one example, the main body 30 may be generally circular or rounded shape, or other shape if desired, and may be formed of plastic or other rigid material. The outer surface of suction interface 40 may be generally circular or other shape as desired.

In accordance with one embodiment of the present disclosure, magnet sub-assembly 34 includes a housing or shoe 54 which includes a cavity 56. A flux guide 58 may be positioned around some or all of magnet 36, and the flux guide 58 and magnet 36 are secured within cavity 56 with screw 60 through the center of magnet 36, in one example. In other embodiments, for example, the magnet 36 may be secured within the cavity by any other means, such as but not limited to an adhesive, a bolt, a tape, a strap, a mechanical connector, an adhesive connector, an electromechanical connector, or the like.

Flux guide 58 may, in one example, be a generally U-shaped bracket made of metal or other material, which amplifies the magnetic force of magnet 36 (for instance, when compared with a magnet that does not have such a flux guide). An overlay material 62 such as Mylar may be attached to cover the external surface of magnet 36, to create a flat and smooth outer surface which may be generally rectangular or other shape as desired.

The shoe/housing 54 may include a lip/outwardly protruding edge 64 which is adapted to engage a corresponding surface of the electronic device 22 to provide structural support between the mount apparatus 20 and electronic device 22 In one embodiment, for example, the lip/edge 64 may extend in one or more directions to provide a structural/mechanical interface between the mount apparatus 20 and the electronic device 22, such as shown herein.

Figure 5:
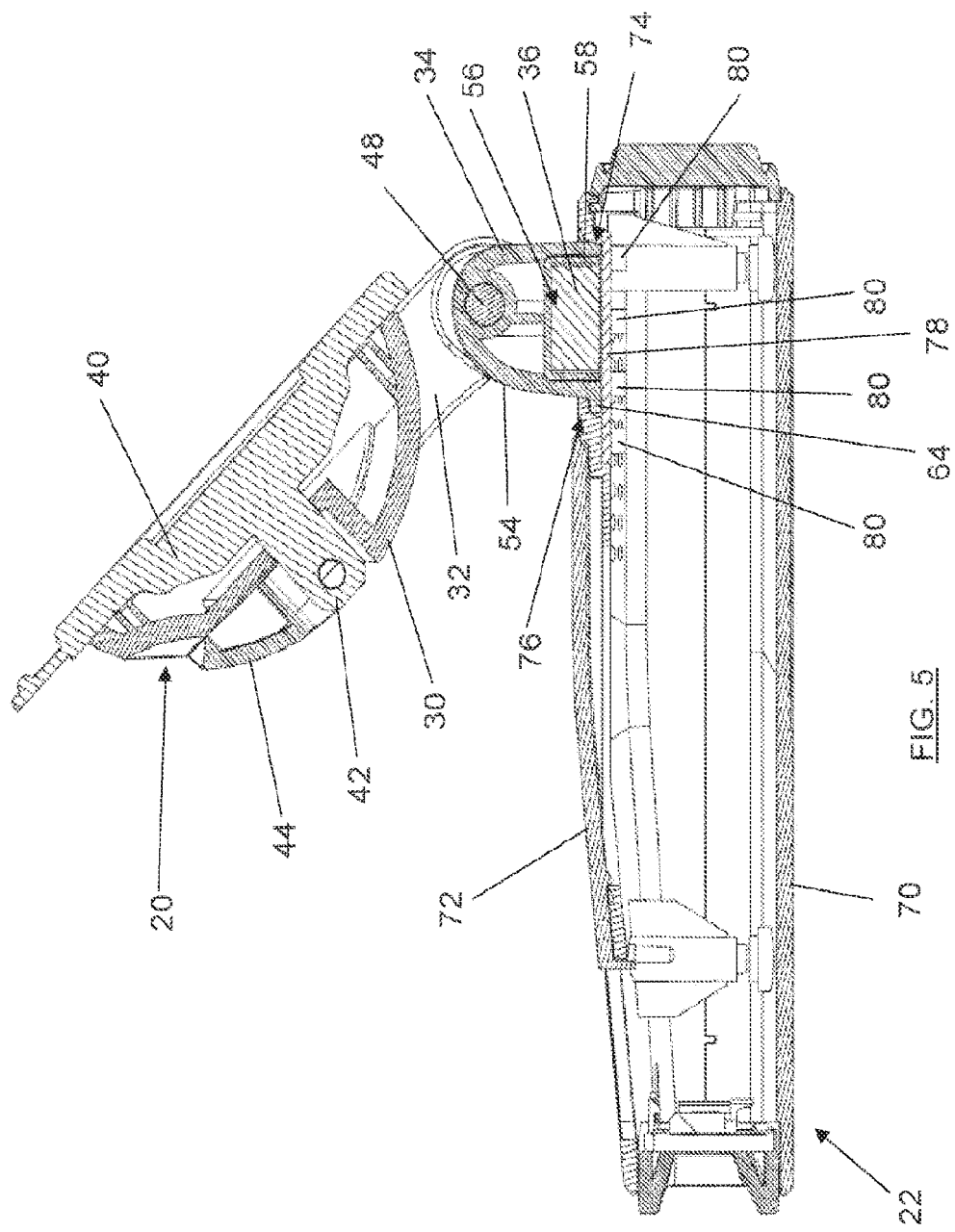
FIG. 5 illustrates a sectional view of an example of a mount apparatus connected with an example of an electronic device, in accordance with one embodiment of the present disclosure.

Referring to FIGS. 1 and 5, electronic device 22 includes a main body 70 with a top portion 72 having a cavity or opening 74 defined therein. Cavity 74 is sized and shaped to receive the distal end of bracket 58, including the outer surface of magnet 36/overlay 62. Cavity 74 defines a lip or bearing surface 76, which is adapted to structurally engage the edge/lip 64 of shoe 54 of magnet sub-assembly 34. The lip or bearing surface 76 of the housing 70 or cavity 74, for example, may provide a cooperating lip or other surface adapted to engage the lip/outwardly protruding edge 64 of the shoe/housing 54 of the mount apparatus 20. A metal plate 78 or other metal or magnetic component is positioned along the lower interior portion of cavity 74, and may be secured to electronic device 22 through one or more heat stakes 80 to provide greater adhesion of the metal plate 78 to electronic device 22. In one example, the metal plate 78 is sized and shaped to selectively engage and mate with outer surface of magnet 36/overlay 62 as desired by the user.

Although FIG. 5 shows a separate metal plate 78 disposed within the cavity 74 of the electronic device housing 70, other configurations are also contemplated. The housing 70, for example, may comprise one or more metal or magnetic surfaces, components, or the like adapted to engage the magnet 36 of the mount assembly 20. Further, the cavity 74 may expose one or more metal surfaces or components of the electronic device 22. The metal plate 78 or other surfaces or components of the electronic device 22 may also be disposed within one or more protective layers (e.g., a portion of the housing 70), through which the magnet 36 and the metal plate 78 or other surfaces or components of the electronic device 22 are adapted to engage.

In use in one example, the user may place the distal end of shoe 54 of mount apparatus 20 into the cavity 74 of electronic device 22. Magnet 36 of the mount apparatus 20 attaches via magnetic force to the metal plate 78 of electronic device 22, thereby providing a magnetic coupling with and support of the electronic device 22 by mount apparatus 20. The flux guide 58 magnifies the magnetic attractive forces between magnet 36 and metal plate 78, which helps to provide a more robust and secure hold between the mount apparatus 20 and the electronic device 22, and also helps to reduce the motion of electronic device 22 relative to mount apparatus 20 during the typical forces and movement experienced when the vehicle is traveling on a road. Moreover, the magnification of magnetic force provided by flux guide 58 also enables mount apparatus 20 to support heavier electronic devices when compared with conventional mounting devices.

In addition to the magnetic coupling between the mount apparatus 20 and electronic device 22, the lip 76 of cavity 74 of the electronic device 22 mechanically engages the edge 64 of the shoe 54 of the mount apparatus 20 that aids in providing structural support of electronic device 22 by mount apparatus 20.

In the particular embodiment shown in FIG. 5, for example, the lip/edge 64 of the shoe/housing 54 engages with the lip 76 of the body 70 along one or more edges of the cavity 56. In this particular example, the electronic device 22 may be tipped or rotated with respect to the mount apparatus 20 to disengage the lip/edge 64 of the shoe/housing 54 and the lip 76 of the body 70 of the electronic device. Then, a mechanical force may be applied to overcome the magnetic force of the magnet 36 and the metal plate 78 (or other coupling component of the electronic device 22) and allow the electronic device to be separated from the mount apparatus 20. Thus, when engaged, the lip/edge 64 of the shoe/housing and the lip 76 of the body 70 of the electronic device 22 provide additional support to maintain the attachment of the electronic device 22 and the mount apparatus 20 during use. During separation, however, the lip/edge 64 of the shoe/housing 54 may be relatively easily disengaged (e.g., by tipping or rotating the electronic device 22 body 70 with respect to the mount apparatus 20) and allow easier disengagement/separation of the electronic device 22 from the mount apparatus 20.

It is understood that embodiments of the present disclosure can be used within a variety of electronic devices 22, such as but not limited to mobile devices, radar/laser detectors, GPS devices, dash cameras, mobile phones, computers, music and multi-media players, and other portable devices.

Accordingly, it can be seen that embodiments of the present disclosure provide mount apparatuses that can be used to securely attach electronic devices to an interior surface of a vehicle.

While portions of the present disclosure have been described and shown with reference to particular operations performed in a particular order, it will be understood that these operations may be combined, sub-divided, or reordered to form equivalent methods without departing from the teachings of the present disclosure. Accordingly, unless specifically indicated herein, the order and grouping of the operations is not a limitation of the present disclosure.

It should be appreciated that in the foregoing description of exemplary embodiments of the disclosure, various features of the disclosure are sometimes grouped together in a single embodiment, figure, or description thereof for the purpose of streamlining the disclosure and aiding in the understanding of one or more of the various aspects. This method of disclosure, however, is not to be interpreted as reflecting an intention that an embodiment requires more features than are expressly recited in each claim. Rather, inventive aspects lie in less than all features of a single foregoing disclosed embodiment, and each embodiment described herein may contain more than one inventive feature.

Although embodiments have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims It will be understood by those skilled in the art that various changes in the form and details may be made from the embodiments shown and described without departing from the spirit and scope of the disclosure.

The invention claimed is:

1. An apparatus for mounting a device to a surface, comprising:
    a first magnet that engages a corresponding magnetic element;
    a first body including a cavity that defines a first lip, wherein the cavity contains one of the first magnet or the corresponding magnetic element, and wherein the first lip extends laterally, inward from the one of the first magnet or the corresponding magnetic element;
    a second body defining a second lip adapted to structurally engage the first lip, wherein the second lip includes a front surface coplanar to an outer surface of the other one of the first magnet or the corresponding magnetic element, and wherein the second lip extends laterally outward from the other one of the first magnet or the corresponding magnetic element, and
    wherein at least one of the first body and the second body includes a suction surface adapted to couple to the surface.

2. The apparatus of claim 1, wherein the corresponding magnetic element includes at least one of a metal plate and a second magnet.

3. The apparatus of claim 1, wherein the first body includes the suction surface and the first magnet.

4. The apparatus of claim 1, wherein the second body includes the corresponding magnetic element.

5. The apparatus of claim 1, wherein both the first lip and the second lip are fixed lips.

6. The apparatus of claim 1, wherein the first lip is parallel to and offset from a bottom surface of the cavity.

7. The apparatus of claim 1, further comprising a flux guide surrounding at least a portion of the first magnet to enhance magnetic force of the magnet.

8. The apparatus of claim 7, wherein the flux guide is formed of metal.

9. The apparatus of claim 7, wherein the flux guide is generally U-shaped.

10. The apparatus of claim 1, wherein the outer surface is generally rectangular.

11. The apparatus of claim 1, wherein a back surface of the second lip engages a bearing surface of the first lip in a first coupled configuration and is adapted to be disengaged from the bearing surface in a second disengaged configuration.

* * * * *